May 10, 1949.    M. E. NULSEN    2,470,049
VIBRATOR TEST CIRCUIT
Filed Nov. 21, 1944
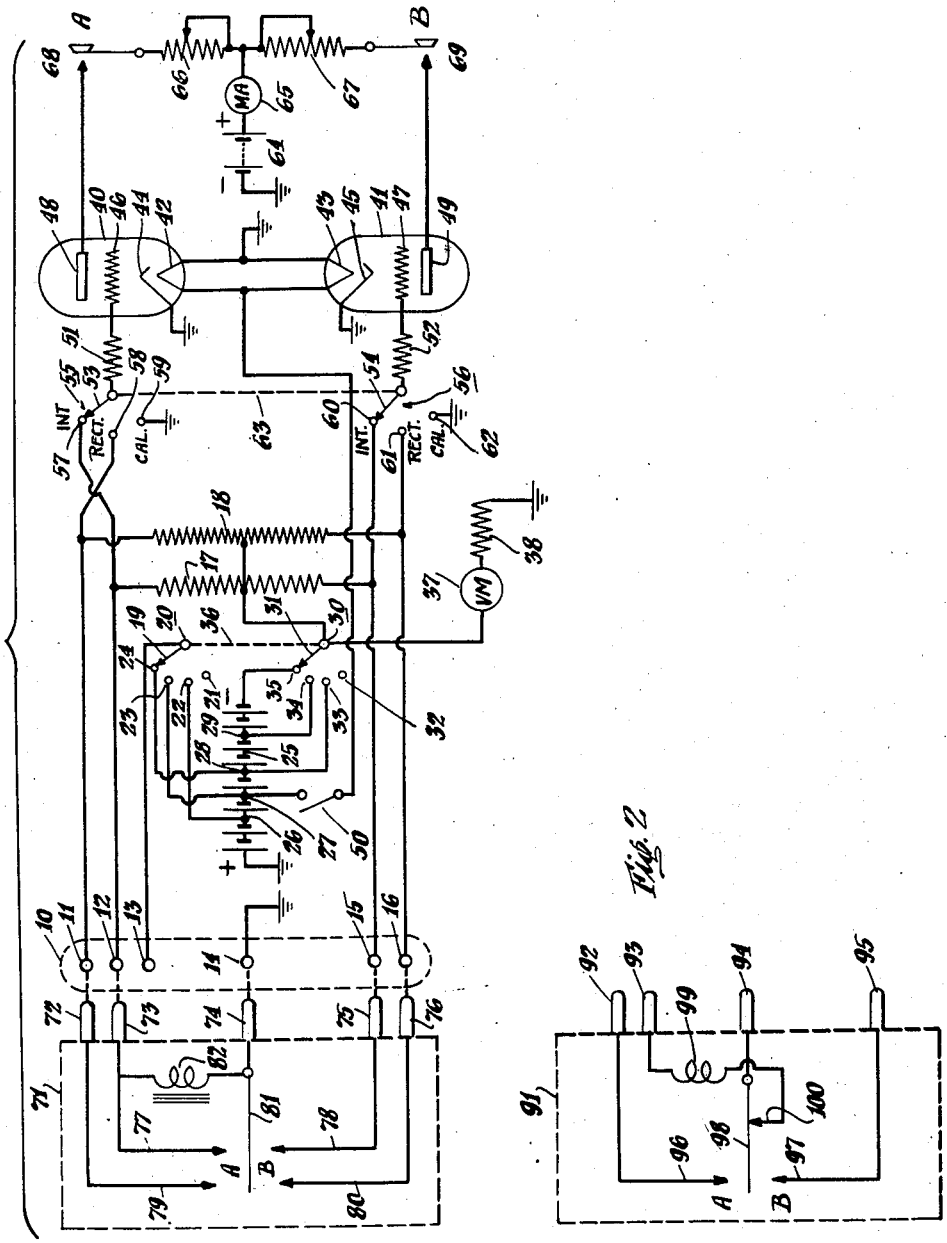
INVENTOR.
Marvin E. Nulsen
BY Chester F. Carlson
ATTORNEY Patented May 10, 1949

2,470,049

UNITED STATES PATENT OFFICE 2,470,049

VIBRATOR TEST CIRCUIT

Marvin E. Nulsen, Indianapolis, Ind., assignor to P. R. Mallory & Co., Inc., Indianapolis, Ind., a corporation of Delaware Application November 21, 1944, Serial No. 564,529

4 Claims. (Cl. 175—183)

The present invention relates to vibrator test circuits, and, more particularly, to an electronic direct-reading instrument for measuring the time efficiency and the contact-dwell balance of vibratory electro-magnetic interrupters.

As those skilled in the art know, in determining the operating characteristics and the contact adjustment of vibratory interrupters, accurate measurement of certain factors connected with the periods during which the contacts are closed is of primary importance. Such factors are, for example, the "time efficiency," that is the contact-dwell period as a percentage of the cycle period for each pair of contacts individually; the "overall time efficiency," that is the sum of the contact-dwell periods of the two pairs of contacts as a percentage of the cycle period; and the "contact balance figure," indicating the ratio of the time efficiencies of the two pairs of contacts. Prior suggestions in this direction included connecting a D'Arsonval type meter in series with the vibrator contacts, said meter operating as a time-averaging type of current measuring instrument. Test circuits of this type, however, had serious limitations in that their use was restricted to testing driver-contact type vibrators. They were unable to yield accurate results in the case of shunt-coil type vibrators because the coil current, a quantity which varies widely during the entire time the pull contacts are open, would also be recorded by the meter and thereby render the meter reading useless as a direct measure of time efficiency. Attempts were made at various times to compensate for the error introduced by the coil current, either by calculation or by introducing a similar coil across the other pair of vibrator contacts. However, of these suggestions and proposals, none was completely satisfactory and successful on a practical and industrial scale.

It is an object of the present invention to provide a vibrator test circuit which eliminates the foregoing difficulties' inseparably connected with the construction and operation of prior devices of the described character.

It is another object of the present invention to provide a direct-reading instrument for rapidly and accurately determining the time efficiency and the contact-dwell balance of the contacts of electro-magnetic vibratory interrupters, including both driver-contact and shunt-coil type vibrators.

It is a further object of the invention to provide an electronic metering device for the instantaneous and accurate measurement of the time efficiency of the contacts of vibratory interrupters of any desired type, such measurement being carried out under actual conditions of load current encountered during the normal operation of the vibrator.

The objects of the invention include direct measurement of the time efficiency of the rectifier contacts, and also ready determination of the time differential between interrupter and rectifier contact-dwell periods, in a vibratory electro-magnetic interrupter.

It is also within the contemplation of the invention to provide a metering device of improved character for measuring the time efficiency of vibratory interrupters, said device being adaptable to carrying out the desired measurements on vibrators which may be of different type or may have different operating voltages.

The invention also contemplates a universal metering device for vibrator time efficiencies which is very simple in construction, reliable in operation, and which may be readily manufactured and sold at a low cost.

Other and further objects and advantages of the invention will become apparent from the following description, taken in conjunction with the accompanying drawing; in which Fig. 1 is the circuit diagram of a preferred form of circuit organization of the device embodying the present invention, together with the circuit of a self-rectifying vibrator of the shunt-coil type; and Fig. 2 is the circuit of a driver-contact vibrator.

While a preferred embodiment of the invention is described herein, it is contemplated that considerable variation may be made in the method of procedure and the construction of parts without departing from the spirit of the invention. In the following description and in the claims, parts will be identified by specific names, for convenience, but they are intended to be as generic in their application to similar parts as the art will permit.

Broadly stated, in accordance with the principles of the invention, the two contacts of the pair of cooperating vibrator contacts, the time efficiency of which is to be measured, are respectively connected to the cathode and grid of an electron tube, such as a suitable triode, and are also arranged to open and close a circuit, which imposes at least cut-off grid potential on the more negative contact from the instant of contact opening to the instant of contact closing. The circuit constants, including the plate voltage and the characteristics of the tube, are so selected that constant plate current will flow upon removal of the said cut-off potential from the grid. In that case, the plate current, which only flows while the contacts are closed, and does so at a constant rate, constitutes a measure of the dwell period of the contacts in question. Likewise, the absence of plate current constitutes a measure of the non-contacting period of the contacts. A current meter of the D'Arsonval type, giving a time-averaging reading, will hence record the ratio of the dwell period to the sum of the dwell- and non-contacting periods, which is the time efficiency of the contacts. Thus, the meter may be directly calibrated in per cent time efficiency, permitting direct and instantaneous reading of this quantity. It is preferred to provide an electron tube circuit of the described type for each of the two pairs of contacts of the vibrator whereby it is made possible to directly determine the time efficiency of each contact pair and also the overall time efficiency of the vibrator. The device may be combined with suitable sockets adapted to receive and to hold vibrator types and with switching means for selectively carrying out the measurement for the interrupter and for the rectifier contacts of synchronous vibrators, for applying different operating voltages to the vibrator, etc., as it will appear more fully hereinafter.

Referring now more particularly to Fig. 1 of the drawing, reference character 10 denotes a vibrator socket of suitable type adapted to match the vibrators to be tested, and having jacks 11 to 16 mounted therein. Of these, jacks 12 and 15 are respectively connected to the two ends of a center-tapped interrupter circuit load resistance 17, and jacks 11 and 16 are respectively connected to the two ends of a center-tapped rectifier circuit load resistance 18. Resistance 17 is of a relatively low value, such as for example 5 ohms, while resistance 18 may have a value of 250 ohms. Jack 14 of the socket is grounded, and jack 13 is connected to contact arm 19 of a rotary tap switch 20, having contacts 21, 22, 23, and 24. Contact 21 of these is disconnected, and contacts 22, 23, and 24 are respectively connected to taps 26, 27 and 28 of a source of direct current 25, the positive terminal of which is grounded. A similar rotary tap switch 30 has its contact arm 31 connected to the center taps of both resistances 17 and 18 and has contacts 32, 33, 34 and 35 of which 32 is disconnected and contacts 33, 34 and 35 are respectively connected to taps 28, 29 and to the negative terminal of the source. It will be noted that source of current 25 has been illustrated as an 8-cell storage battery, the voltage difference between taps 26, 27 and 28 being one cell, while the voltage difference between taps 28, 29 and the negative terminal is two cells. Contact arms 19 and 31 are connected for joint operation by means of a shaft, diagrammatically indicated by dotted line 36. A voltmeter 37 is connected between the center taps of resistances 17 and 18 and ground through a series resistance 38 and indicates at all times the operating voltage applied to the vibrator under test.

The metering circuit comprises a pair of triodes 40 and 41, having heaters 42 and 43, cathodes 44 and 45, grids 46 and 47, and plates 48 and 49, respectively. One end of both heaters is grounded, and the other end thereof is connected to tap 27 of source 25 through a switch 50. Cathodes 44 and 45 are both grounded and grids 46 and 47 are respectively connected through resistances 51 and 52 of about 20,000 ohms each to contact arms 53 and 54 of two contact selector switches 55 and 56, respectively. Switch 55 has three contacts adapted to cooperate with its switching arm, of which 57 is connected to jack 12, 58 is connected to jack 11, and 59 is grounded. Switch 56 has likewise three contacts, 60, 61, and 62, of which 60 is connected to jack 15, contact 61 is connected to jack 16, and contact 62 is grounded. Contact arms 53 and 54 are connected for joint rotation by means of a shaft 63. Plates 48 and 49 of the tubes are connected to the positive terminal of a B battery 64 through a meter 65 and through adjustable resistances 66 and 67 and through contactor keys 68 and 69, respectively. The negative terminal of battery 64 is grounded. Battery 64 may have a voltage of 22½ volts and resistances 66 and 67 may be non-inductive potentiometers having a resistance of 10,000 ohms each. Of course, both battery 64 and direct current source 25 may be provided in the form of properly filtered power supply units of suitable type, operation of which may be initiated by filament switch 50 at the same time when the heater circuits of tubes 40 and 41 are closed. Meter 65 is a D'Arsonval type instrument of the type that indicates the time-averaging value of the current. Its scale preferably comprises 100 graduations, numbered at intervals from 0 to 100, thus reading time efficiency directly in per cent. The sensitivity of this meter is such that full deflection corresponds to 1 milliampere.

From the foregoing description, the operation of the time efficiency meter of the invention will be readily understood by those skilled in the art. To calibrate the instrument, first filament switch 50 is closed, closing the heater circuits of tubes 40 and 41, and contact selector switches 55 and 56 are set to their calibrating position in which their switching arms 53 and 54 make with contacts 59 and 62, respectively. In this position, grids 46 and 47 are at cathode or ground potential, permitting the flow of plate current. Contactor key 68 (A) is now held closed and resistance 66 is adjusted until full deflection of meter 65 is obtained. Contactor key 68 is now released and key 69 (B) is closed, while its resistance 67 is adjusted until full-scale deflection of meter 65 is obtained. The device is now calibrated and ready for use.

To measure the time efficiency, the vibrator to be tested is plugged into socket 10. Of course, a plurality of different sockets may be provided, to provide for vibrators of different type and having different base pin arrangements. Thus, for example, a synchronous vibrator 71 of the shunt-coil type may be tested, having base pins 72 to 76 of which 73 and 75 are connected to relatively stationary interrupter contacts 77 and 78, respectively, and pins 72, 76 are connected to stationary rectifier contacts 79 and 80, respectively. It will be understood that the vibrator is shown schematically so that the auxiliary contacts normally provided on the reed do not appear in the drawing. However, the expression "set of contacts" in the appended claims is intended to refer to any one of the contacts shown, as for example contact 79, together with the auxiliary contact or other contact means provided on the reed. In a broader sense, the expression "set of contacts" may, of course, refer to any pair of contact members properly connected to the socket 10. Pin 74 is connected to reed 81 bearing vibratory contacts cooperating with the said stationary contacts (not shown) and a shunt coil 82 is connected across the reed and one of the interrupter contacts, 77. Upon insertion of this vibrator into socket 10, pins 72 to 76 thereof will be respectively engaged by jacks 11, 12, 14, 15, and 16 of the socket.

Cell selector switch 30 will now be set to the proper operating voltage and connects the corresponding negative terminal or tap of source 25 to the center taps of load resistances 17 and 18. In this connection, it is to be observed that the device of the invention employs non-inductive resistances as loads rather than the conventional center-tapped transformer. The absence of the conventional center-tapped transformer makes necessary the use of double the rated voltage of the vibrator under test in order that the voltage applied to the shunt coil, and hence the reed amplitude, be substantially the same as when a transformer is used. Shunt coil 82 will now be energized through its connection to the reed grounded through pin 74 and jack 14 and thus connected to the positive terminal of source 25, while its other end through pin 73 and jack 12, the upper half of resistance 17, switching arm 31, and one of contacts 33 to 35 is connected to the corresponding negative terminal of the source. Reed 81 will be deflected until it closes interrupter contact 77 and shunts coil 82 and at the same time passes current through the upper half of the said resistance 17. The deflected reed will now pass through its neutral position and closes the other interrupter contact 78, thereby passing current through the lower half of resistance 17, through pin 75 and jack 15. Thus, the reed will be maintained in continuous vibratory motion in a manner well understood, alternately passing current through the two halves of interrupter circuit load resistance 17. During vibration of the reed, it will also alternately ground rectifier contacts 79 and 80, respectively connected to the two ends of rectifier load resistance 18 through the corresponding base pins of the vibrator and jacks of the socket. Therefore, rectifier load current will be alternately passed through the two halves of the said resistance 18. In order to closely simulate actual load conditions, resistance 17 is so determined as to have about 5 amperes flowing through the interrupter portion of the circuit and resistance 18 is so determined as to have about 0.1 ampere flowing through the rectifier portion of the circuit. These currents can, of course, be increased or decreased as desired.

To carry out the measurement of the time efficiency of the interrupter contacts, contact selector switches 55 and 56 are turned to their interrupter position in which they make with contacts 57 and 60, respectively, and connect the two ends of load resistance 17 to the grids of tubes 40 and 41. It will be noted that this will apply negative potential beyond cut-off to the grids when the interrupter contacts are open and will apply cathode potential to the grids when the said contacts are closed. Thus, the integrated plate current flowing through the tubes will be proportional to the ratio of closed contact period to the full cycle. Therefore, upon closing key A, the meter reading will be the time efficiency of interrupter contacts A, and upon closing key B, the meter reading will be the time efficiency of interrupter contacts B. Simultaneous closing of both keys A and B will give a meter reading indicating the overall time efficiency of the interrupter contacts of the vibrator. This will equal the sum of the two preceding readings if the meter and the apparatus are in proper calibration. The ratio of the smaller of readings A and B to the larger is the "percentage balance" of the two pairs of contacts A and B.

To carry out the same measurements for the rectifier contacts, contact selector switches 55 and 56 are adjusted to their rectifier position in which they respectively make with contacts 58 and 61, thus connecting the ends of rectifier load resistance 18 to the grids of tubes 40 and 41. Repeating now the steps carried out for the interrupter contacts, the readings will correspond to the time efficiencies of the respective rectifier contacts, instead of the interrupter contacts.

From the results of the foregoing measurements on the interrupter and rectifier contacts, the time-differential percentage of the vibrator may be easily determined, this being the difference between the time efficiency of a given pair of interrupter contacts and that of the corresponding pair of rectifier contacts.

The instrument of the invention is also adapted to measure the time efficiency of a driver contact vibrator, such as the vibrator 91 shown in Fig. 2 and comprising base pins 92 to 95, of which 92 and 95 are respectively connected to relatively stationary interrupter contacts 96 and 97, pin 94 is connected to reed 98, and pin 93 is connected to one end of a driver coil 99. The other end of coil 99 is connected to a driver contact 100, normally making with reed 98. When this vibrator is plugged in into socket 10, its pins 92 to 95 will be respectively engaged by jacks 12, 13, 14, and 15 of the socket. It will be noted from Figs. 1 and 2 that in this case reed 98 will be connected to the positive terminal of direct current source 25, contacts 96 and 97 (A and B) will be connected to the two ends of interrupter circuit load resistance 17 and the end of driver coil 99 will be connected to switching arm 19 of cell selector switch 20. Cell selector switches 20 and 30 will be set in accordance with the rated voltage of the vibrator under test. It will be noted that switch 20 supplies the rated voltage to the driver coil, in contrast to the case when shunt-coil type vibrators are tested, where double of the rated voltage is supplied to the shunt coil. As one end of driver coil 99 is connected to the positive terminal of the source through contact 100, reed 98, ground pin 94, and jack 14, and the other end of said coil is connected to a negative tap of the source through switch 20, jack 13, and pin 93, the reed will be maintained in continuous vibration, and current will be alternately passed through the two halves of load resistance 17. Now the measurement of time efficiency of interrupter contacts A and B may be carried out in the same way as it has been described in the foregoing. Of course, vibrator 91 may be likewise provided with rectifier contacts, which can be checked as to their time efficiency same as the rectifier contacts of shunt-coil vibrator 71.

Tubes 40 and 41 may be triodes of any suitable type, such as, for example, a 6SN7GT twin triode, in which case grid current limiting resistances 51 and 52 may be omitted. It has been found, however that when using such triodes of the high-vacuum type, the time efficiency readings were slightly low. This was traced to the fact that even though a touching pair of vibrator contacts be connected respectively to the cathode and grid of the triode, the grid is at a slightly lower potential than is the cathode, because of the small voltage drop across the touching contacts, the reed, the socket clips or jacks, and the associated leads, when these elements are carrying current. Obviously, this slight reduction in grid potential causes the plate current to be less during the time the contacts are touching than the full scale meter reading to which the plate current was previously adjusted when the contact-selector switch was in the calibrating position, where the grid was directly connected to the cathode.

This difficulty may be eliminated by using tubes in which the plate current is independent of small negative grid potential swings away from the cathode potential. Thus, excellent results were obtained with a pair of type 884 Thyratron gas-filled tubes, connected as indicated in Fig. 1, wherein resistances 51 and 52 are interposed in the grid circuits to limit the grid current. By employing relatively low plate voltages, of the order of 22½ volts, and relatively high negative grid potentials, of the order of 7.9 to 17.6 volts, it is assured that the grid will retain control over the plate current at all times. This is in contrast to the conventional operation of tubes of this general type with high plate voltages, where the grid loses control over the plate current once the flow of plate current has been initiated.

In some cases, it has been found desirable to eliminate the B-battery and to supply an A. C. voltage to the plates of the Thyratron tubes. This has the advantage that the grids of the tubes will retain their control over the plate current at much lower grid voltages, such as may be encountered when testing vibrators having an operating voltage lower than 6 volts. Preferably, the plates are supplied with an alternating voltage of a frequency which is high enough to have the time of a plate current pulse constitute a negligible percentage of the vibrator contact-dwell period and still not high enough to have the time between pulses shorter than the deionization time of the tube. Thus, an alternating voltage of 12,000 to 15,000 cycles per second provides excellent results, such voltage being obtained, for example, from a suitable audio-frequency oscillator.

It will be noted that the principles of the invention provide various advantages. First of all, the device of the invention permits the determination of the time efficiencies of vibrators of any desired type and of any desired voltage rating under actual and normal load-current conditions. The time efficiency, including the overall time efficiency, is directly and instantaneously read on the meter without the necessity of any calculation or conversion. As the grid currents of the tube are negligible compared to the operating currents in the interrupter and rectifier circuits, the measuring circuit has absolutely no effect upon the load conditions or upon the wave form of the vibrator under test. Moreover, the device of the invention is extremely simple in construction and may be manufactured at a very low cost so that it may be advantageously used not only in manufacturing practice and in development work but also by servicemen for testing the relevant operating characteristics of vibrators now used on a substantial scale in all kinds of mobile communication equipment.

Although the present invention has been described in connection with a preferred embodiment thereof, variations and modifications may be resorted to by those skilled in the art without departing from the principles of the present invention. All of these variations and modifications are considered to be within the true spirit and scope of the present invention, as disclosed in the foregoing description, and defined by the appended claims.

What is claimed is:

1. A testing arrangement for a vibrator including a reed, a pair of contacts cooperating with said reed and electromagnetic driving means for said reed; comprising a pair of contact terminals adapted to be respectively connected to said contacts, a reed terminal adapted to be connected to said reed, a load having its ends connected to said contact terminals, a source of direct current having its positive pole connected to said reed terminal and its negative pole connected to a point of said load, a tube having an anode, a cathode and a control grid, a connection between one of said contact terminals and said control grid, a connection between said reed terminal and said cathode, and an indicator of the average current type connected in the anode circuit of said tube, said tube being biased to cut off when said load is disconnected from said source.

2. A testing arrangement for a vibrator including a reed, a pair of interrupter contacts, a pair of rectifier contacts, each of said pairs of contacts cooperating with said reed, and electromagnetic driving means for said reed; comprising at least two pairs of contact terminals adapted to be respectively connected to said contacts, a reed terminal adapted to be connected to said reed, a first load having its ends connected to the contact terminals for said interrupter contacts, a second load having its ends connected to the contact terminals for said rectifier contacts, a source of direct current having its positive pole connected to said reed terminal and its negative pole connected to a mid-point of each of said loads, a tube having an anode, a cathode and a control grid, connective means including a selective switch between said contact terminals and said control grid for selectively connecting a contact of either said interrupter contacts or said rectifier contacts, a connection between said reed terminal and said cathode, and an indicator of the average current type connected in the anode circuit of said tube, said tube being biased to cut off in the open position of said contacts, said indicator measuring the dwell period of the contact selectively coupled to said grid.

3. A testing arrangement for a vibrator including a reed, a pair of contacts cooperating with said reed and electromagnetic driving means for said reed; comprising a pair of contact terminals adapted to be respectively connected to said contacts, a reed terminal adapted to be connected to said reed, a load having its ends connected to said contact terminals, a source of direct current having its positive pole connected to said reed terminal and its negative pole connected to a mid-point of said load, a pair of tubes each having an anode, a cathode and a control grid, connective means including a selective switch between said contact terminals and each of said control grids for selectively coupling one of said pairs of contacts to the grid of one of said tubes and the other one of said pairs of contacts to the grid of the other of said tubes, a connection between said reed terminal and said cathode, and an indicator of the average current type connected in a circuit common to the anode circuit of each of said tubes, said tube being biased to cut off when said load is disconnected from said source.

4. A testing arrangement for a vibrator including a reed, a pair of interrupter contacts, a pair of rectifier contacts, each of said pairs of contacts cooperating with said reed, and electromagnetic driving means for said reed; which comprises at least two pairs of contact terminals adapted to be respectively connected to said contacts, a reed terminal adapted to be connected to said reed, a first load having its ends connected to the contact terminals for said interrupter contacts, a second load having its ends connected to the contact terminals for said rectifier contacts, a source of direct current having its positive pole connected to said reed terminal and its negative pole connected to a mid-point of each of said loads, a pair of tubes each having an anode, a cathode and a control grid, connective means including a selective switch between contact terminals for one of said interrupter contacts and one of said rectifier contacts and a control grid for one of said tubes for selectively coupling either said one interrupter contacts or said one rectifier contact to the grid of said one tube, similar connective means including a selective switch between the remaining contact terminals and the grid of the other one of said tubes for selectively coupling either of the remaining one of said interrupter contacts or the remaining one of said rectifier contacts to the grid of the other one of said tubes, a connection between said reed terminal and said cathode, an anode circuit for each of said tubes, a portion of each of said anode circuits being common to both, an indicator of the average current type connected in said common portion, said tubes being biased to cut off during the open position of said contacts, said indicator measuring the dwell period of the contacts selectively coupled to said grids respectively.

MARVIN E. NULSEN.

REFERENCES CITED

The following references are of record in the file of this patent:

UNITED STATES PATENTS

| Number | Name | Date |
| --- | --- | --- |
| Re. 15,469 | Heising | Oct. 17, 1922 |
| 1,340,936 | Conway | May 25, 1920 |
| 1,560,727 | Pruden | Nov. 10, 1925 |
| 1,677,157 | Weaver | July 17, 1928 |
| 1,795,656 | Massonneau | Mar. 10, 1931 |
| 1,931,558 | Saunders | Oct. 24, 1933 |
| 2,244,338 | Krebs | June 3, 1941 |
| 2,248,545 | McConnell | July 8, 1941 |
| 2,254,175 | Eltgroth | Aug. 26, 1941 |
| 2,261,010 | Weise | Oct. 28, 1941 |
| 2,287,174 | Heising | June 23, 1942 |

OTHER REFERENCES

Morecroft, Electron Tubes, John Wiley and Sons, Inc., New York.